J. Chilver.
Pipe-Molding Mach.
№ 1,750
32,754
Patented July 9, 1861.

Witnesses:
Wm R. Whitehead
James S. Ferguson

Inventor:
John Chilver

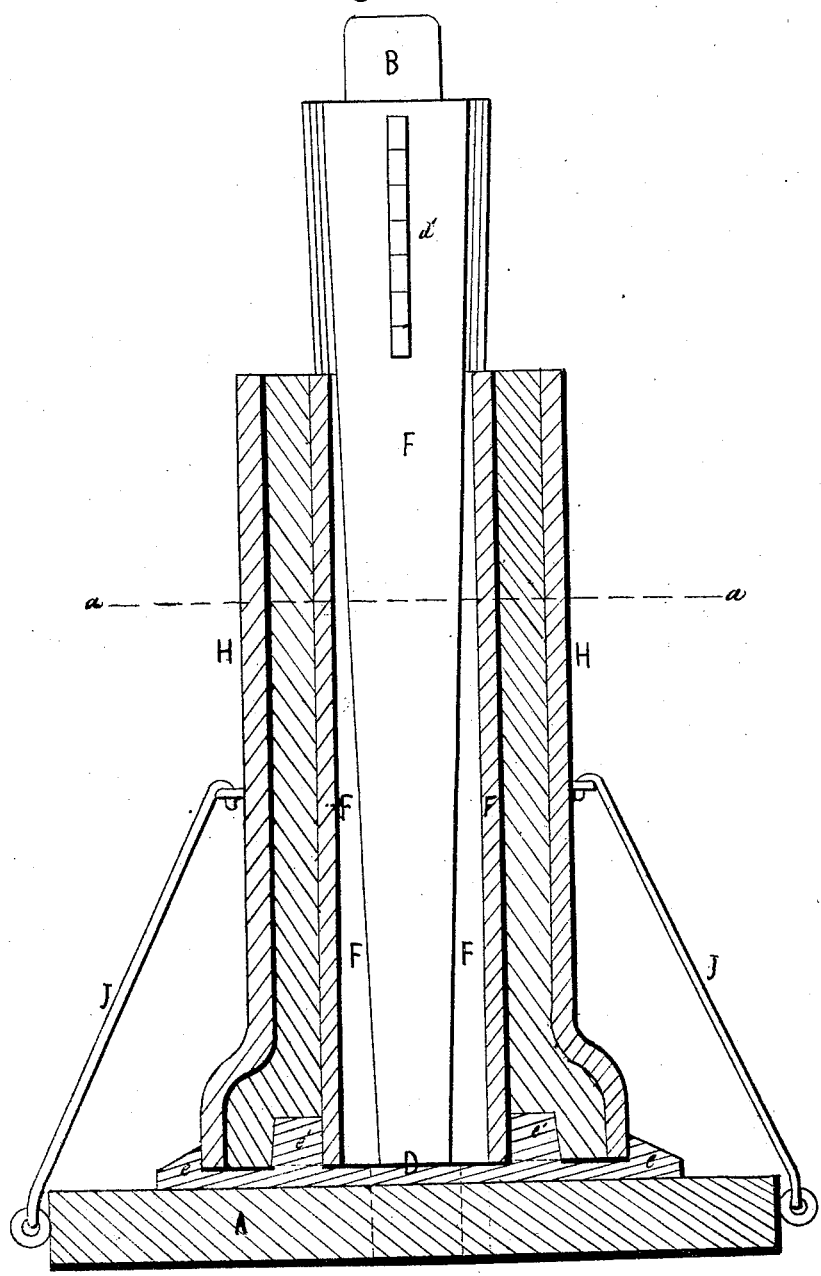

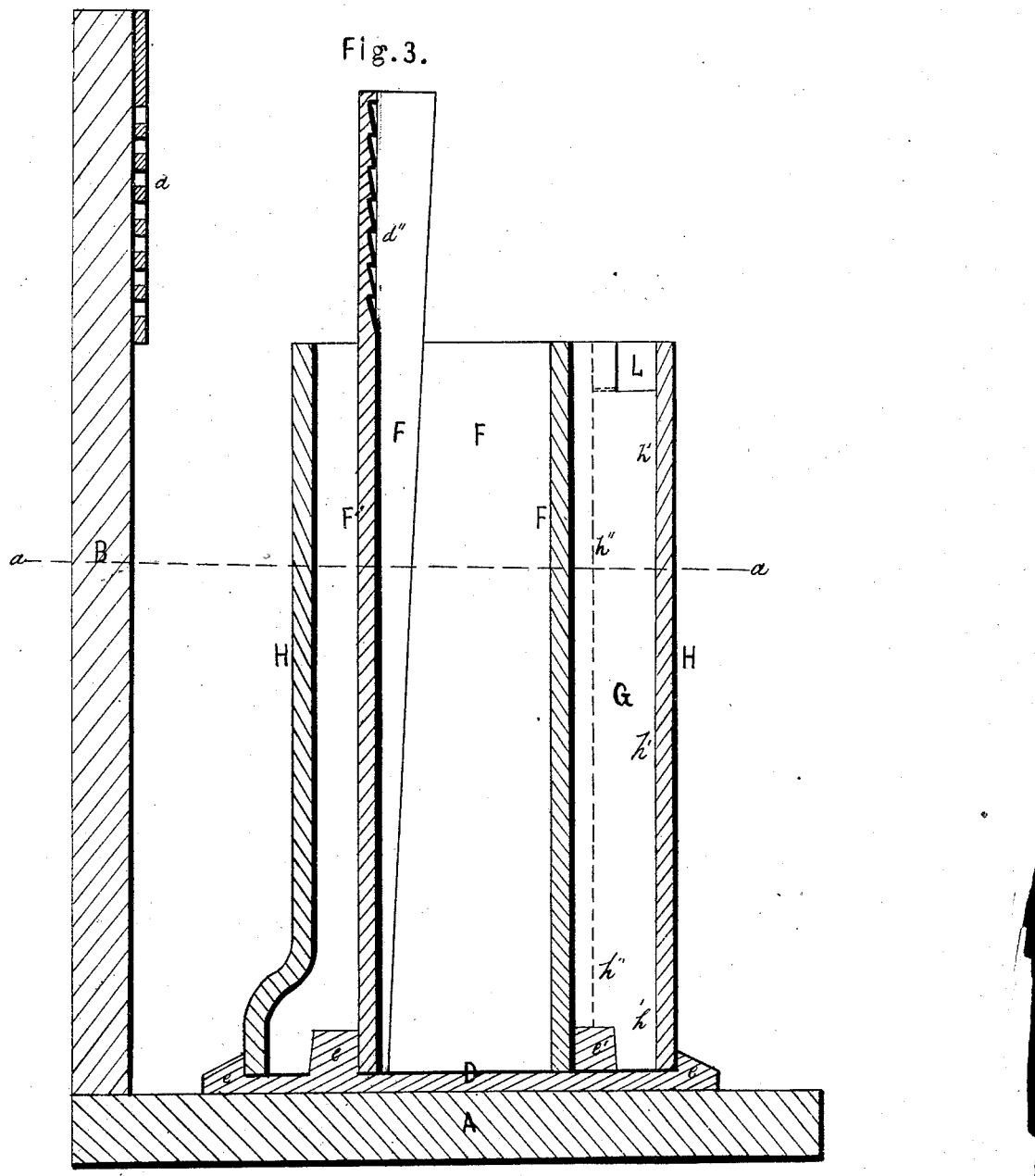

ced to describe their construction and operation.
UNITED STATES PATENT OFFICE.

JOHN CHILVER, OF JERSEY CITY, NEW JERSEY.

IMPROVEMENT IN MOLDS FOR MOLDING PIPES OF PLASTIC MATERIALS.

Specification forming part of Letters Patent No. 32,754, dated July 9, 1861.

*To all whom it may concern:*

Be it known that I, JOHN CHILVER, of Jersey City, in the county of Hudson and State of New Jersey, have invented certain new and useful Improvements in Molds for Molding Pipe from Plastic Material; and I hereby declare the following to be a full, clear, and exact description of the same, reference being had to the annexed sheet of drawings, making part of this specification, and the letters of reference marked thereon.

Figure 1:
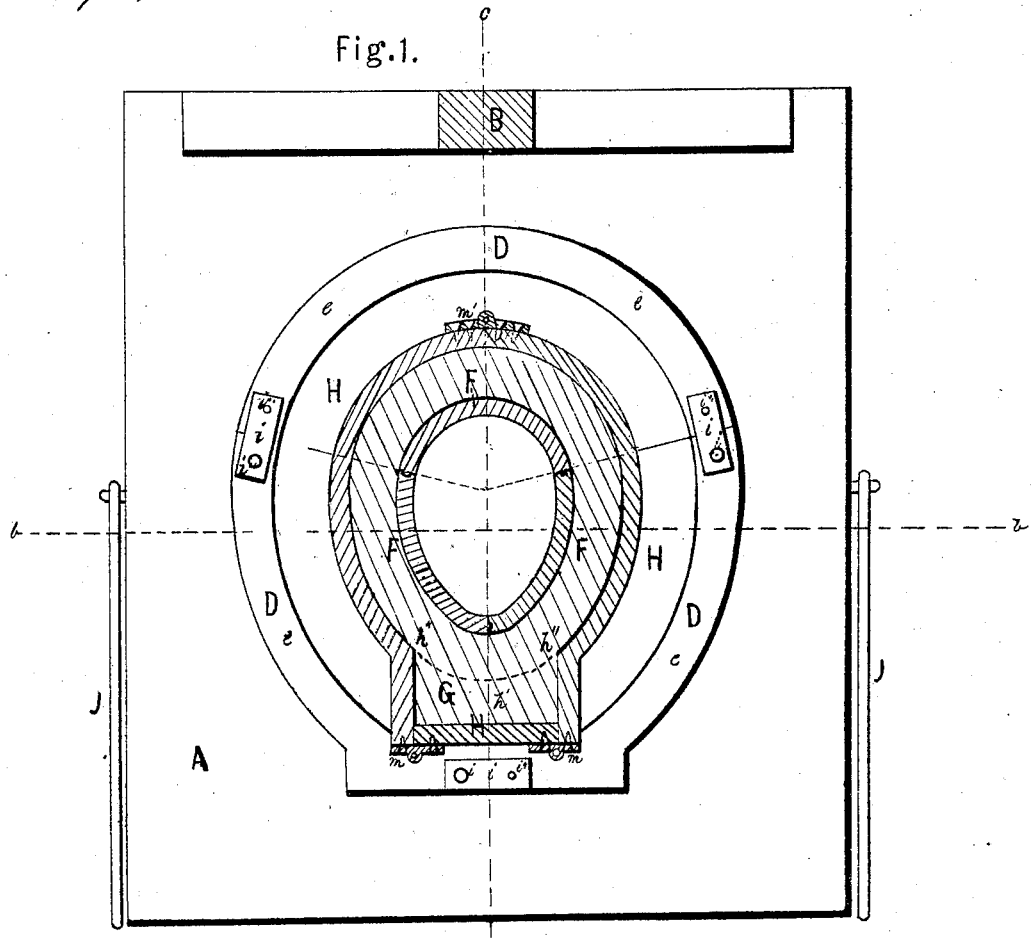
Figure 4:
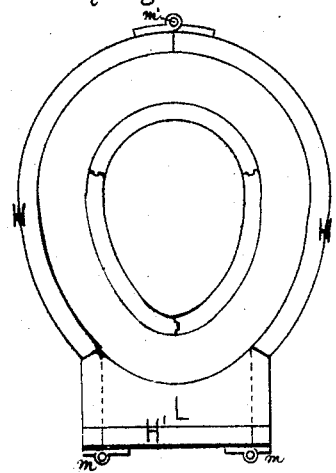

On the said sheet, Figure 1 is a horizontal section on the line $a\,a$. Fig. 2 is a vertical section on the line $b\,b$. Fig. 3 is a vertical section on the line $c\,c$ of a mold constructed with my improvements, and Fig. 4 is a plan view of the top end of the same. In all the figures and in this written specification like letters of reference refer to like parts.

The nature of the first part of my invention consists in so constructing a mold that a joint of whole pipe, provided with means of connection with other joints of similar pipe and with a base the bottom of which is flat and the sides of which are narrow and vertical to connect the flat bottom with the flaring part of the pipe, may be made at one operation.

The nature of the second part consists in providing the mold with a core of uniform shape and size from end to end, so constructed that it can be expanded to give a lateral pressure to the material forming a joint of pipe and can be contracted to be readily removed from the bore of the same, and in constructing the bed-plate and collar in sections, so that while supporting the core they may yield to the expansion of it, as hereinafter described.

In order to enable others skilled in the art to make and use my improvements, I will proceed to describe their construction and operation.

A is a platform on which the mold is to be placed.

B is a post permanently affixed to and projecting upward from one side of the platform to above the top of the mold.

$d$ are mortises or steps made through a plate on the upper end of the post on the side facing the mold.

D is the bed-plate, made in three sections and fastened together by links $i$, bolts $i'$, and adjustable pins $i''$, or by any other suitable means.

$e$ is a flange made to fit close around the bottom and largest end of the flask to receive and support the same in position.

$e'$ is another flange, of sufficient width and thickness to constitute a collar, to form a recess in one end of a joint of pipe. It is made to fit close around the end of the core to receive the same and aid in sustaining the core in position. These flanges are both made in sections, the same as the bed-plate, of which they are parts.

F is the core, also made in three sections and joined together at their side edges. It is best to join them by tongues and grooves, as shown in Figs. 1 and 4. Two of the sections should be of the length of the desired joint of pipe and should agree with each other in size and shape. Between the edges not joined to each other of these sections a tapering space should be left, into which the third section should be fitted, so as to readily slide up and down therein, and as one end of this third section is wider than the other end the result will be to expand and contract the core. In order to enable it to so slide without opening the core at top or bottom, it should be longer than the two first sections. To admit of its descent, an opening must be cut through the bed-plate and platform. $d'$ are notches made in the surface of the inner face of this (third) section at its widest end to provide means for its being withdrawn when down without marring the joint of pipe. H is the flask of the mold, made in three parts and joined together by hinges $m$ and joinings $m'$, provided with adjustable pins, or by any other suitable means. Its inner wall from top to bottom is diverged at $h''$ from a concave surface into flat or plain surfaces to form, with the flat or plain surface $h'$, also extending from top to bottom of the flask, the part G of the mold, in which and by which a base having a flat bottom and vertical sides is formed on a joint of pipe.

L is a movable flat piece, in thickness equal to the length of the stem to be formed on the end of a joint of pipe. It is fitted flush into the upper end of the flask across the part G, with its straight edge resting against the upper end of the flat surface $h'$ in such a manner as shall serve to keep it endwise and sidewise in place. Its inner edge is shaped so as to correspond with the concaved surface or wall of the upper end of the flask. It is to form a stem on a joint of pipe having a base or flat bottom by stopping off a portion of the upper part of the part G, so that the joint may be provided with means by which it can be joined to an outer joint of similar pipe, the stem of one joint being formed so as to permit of its entering the recess of another joint.

J are two rods hinged by eyebolts to the platform at opposite sides, and are, by hooks on their ends and bolts on the side of the flask, connected to the flask.

Though in practice it will be found most desirable to construct the core and the bed-plate in three sections, as described, yet the number of sections may be varied in either and not depart from the spirit of my invention.

The operation of my improvements are as follows: The sections of the bed-plate are put upon the platform and locked together, care being taken that the opening in the bed-plate shall be over the opening in the platform. The sections of the core are joined together and placed within the collar or flange $e'$, with the third section over the opening through the bed-plate and platform. They now constitute a core of uniform size and shape from end to end. The flask is locked together and placed with its largest end downward within the flange $e$, and fastened there by the rods J hooking onto it. The material of which the joint of pipe is to be made is now pressed into the mold up to the level of the seat of the piece L, said piece being left out of place to facilitate this operation. The piece L is now put in place and the filling completed, and the sections of the bed-plate are next disjointed by the removal of the pins $i''$. The third section of the core is forced downward through the opening of the bed-plate and platform by the agency of a lever fulcrumed in one or more of the steps $d$ and pressed on the upper end of the section. This will enlarge the core equally from end to end, and also enlarge the outer circle of the collar by pushing the sections of the bed-plate outward, and as the flask is unyielding the material forming the joint of pipe will be compressed laterally from end to end. The enlargement of the collar will enlarge the recess, so as to permit the stem of another joint to readily enter it. The third section of the core is next drawn upward by the agency of the lever and a bill or claw attached to the lever, said claw engaging in one or more of the notches $d'$. This frees all the sections and contracts the core, whereupon it is readily removed from the pipe. The sections of the bed-plate are now driven inward to contract the collar to free it from the side of the recess. The piece L is removed from its seat. The hooks J are disconnected from the flask, and the flask containing the joint of pipe is taken from the bed-plate and placed where it is designed to deposit the joint of pipe. The flask is now unlocked by removing the adjustable pins from the joinings $m'$ and unfolded sidewise from around the joint, which completes the operation. I now have a joint of whole pipe, furnished with a stem on one end and a recess on the other to connect the joint with other joints of similar pipe and with a base or flat bottom on which the joint is to rest, the whole formed of highly-compressed material, and consequently of great strength.

What I claim as my invention, and desire to secure by Letters Patent, is—

1. The construction of a mold with its flat bottom and the projection L, whereby the sections of pipe made therein may be readily coupled and have a continuous base, substantially as described.

2. The combination, with the flask of a mold, of a core of uniform size and shape from end to end, constructed so as to expand and contract, substantially as described.

3. The combination of the sectional bed-plate and collar with the flask of the mold and with an expansible and contractible core, combined and operating substantially as described.

JOHN CHILVER.

Witnesses:
 WM. R. WHITEHEAD,
 JAMES S. FERGUSON.